United States Patent [19]

Simpson et al.

[11] 4,366,403
[45] Dec. 28, 1982

[54] BRUSH ASSEMBLY AND MOUNTING ARRANGEMENT FOR A PORTABLE TOOL

[75] Inventors: Frank F. Simpson, Staines; John W. Johnson, Wimbledon; Robert J. Oatham, Caldecote, all of England

[73] Assignee: Black & Decker Inc., Newark, Del.

[21] Appl. No.: 181,818

[22] Filed: Aug. 27, 1980

[30] Foreign Application Priority Data

Aug. 31, 1979 [GB] United Kingdom ................. 7930273

[51] Int. Cl.³ .......................................... H02K 13/00
[52] U.S. Cl. .................................... 310/239; 310/50; 310/242
[58] Field of Search ................ 310/50, 238, 239, 242, 310/245, 68 D, 244, 246, 247, 89, 91, 231

[56] References Cited

U.S. PATENT DOCUMENTS

| | | |
|---|---|---|
| 1,693,322 | 11/1928 | Stanton . |
| 2,727,165 | 12/1955 | Schaffer ............................. 310/246 |
| 2,870,354 | 1/1959 | Antonidis et al. .................. 310/247 |
| 3,229,135 | 1/1966 | Peltret . |
| 3,745,393 | 7/1973 | Spors ................................. 310/247 |
| 3,813,567 | 5/1974 | Schmuck ........................... 310/239 |

FOREIGN PATENT DOCUMENTS

| | | |
|---|---|---|
| 1760959 | 2/1958 | Fed. Rep. of Germany . |
| 2804681 | 8/1979 | Fed. Rep. of Germany . |
| 1130026 | 9/1956 | France . |
| 1319918 | 1/1963 | France ............................... 310/245 |
| 2175666 | 10/1973 | France . |
| 2435839 | 4/1980 | France ............................... 310/239 |
| 55-66249 | 5/1980 | Japan ................................. 310/68 D |
| 2023942 | 1/1980 | United Kingdom ................ 310/239 |

Primary Examiner—J. D. Miller
Assistant Examiner—D. L. Rebsch
Attorney, Agent, or Firm—Walter Ottesen; Edward D. Murphy; Harold Weinstein

[57] ABSTRACT

There is disclosed an easily demountable brush assembly for electric motors utilized in portable electric tools. The assembly includes brush units which when removed from an open end of the motor casing provides ready access to the brush holders for the conventional carbon brush. Each brush unit includes a non-conductive board which is mounted radially with respect to the commutator of the motor. The boards are secured within grooves formed on the inner wall of the motor casing. Finally, the open end of the motor casing is supplied with a removable cap which holds the brush units in position when the cap is secured to the motor.

12 Claims, 11 Drawing Figures

BRUSH ASSEMBLY AND MOUNTING ARRANGEMENT FOR A PORTABLE TOOL

BACKGROUND OF THE INVENTION

Many portable hand tools are powered by electric motors. They are subjected to heavy use under arduous conditions. Such tools require periodic maintenance including replacement of the commutator brushes. It has, therefore, been important that the brush units of the brush assembly should be easily accessible to enable brush replacement to be carried out quickly and without the use of special tools.

In such tools it is common to provide access to the brush units via access ports in the housings for electric motors, each brush unit having its own access port. However, such an arrangement requires one access hole per brush unit. In addition, the design of the brush units themselves is pre-determined to some extent so that they may be able to be entered and withdrawn through the comparatively small access ports. Recently, it is also common practice to employ thermoplastic materials for the housings despite the fact that such materials deteriorate in the presence of heat and it is found that deterioration is most likely to occur in those parts of the housing in the immediate vicinity of the commutator brushes.

BRIEF SUMMARY OF THE INVENTION

There is provided in the present invention an improved brush assembly that makes the brush and/or brush unit easily accessible for repair and replacement. The brush assembly is also of simple and relatively inexpensive construction.

The electric motor of the tool is housed in a motor casing fabricated of a polymeric material. The motor casing is open at least at one end and is adapted and constructed to receive the brush units of the brush assembly according to the invention therethrough. Each brush unit comprises a brush board located in an axially oriented groove internally of the motor casing containing the electric motor. Each brush unit is accessible through the mentioned open end of the casing. The brush unit is retained in the position proximate the open end and is detachably secured in the motor casing. A single detachable flanged cap is provided to close the open end, which cap has holding means formed on the inner wall thereof for assisting in the retention in place of the brush units.

Brush units incorporate three-sided brass brush holders with integral terminals for carbon brush and field leads. These channels are each mounted on separate planar boards made of insulating material such as synthetic resin-bonded paper of constant thickness. Each board is mounted in an axial groove arranged on an internal wall of the casing of the electric motor. The cap is recessed in the outer housing and is designed to be removed and replaced independent of the other housing parts. When the single cap is removed, both brush units are available for servicing.

As mentioned above, the brush holder of each brush unit includes terminals integrally formed therewith. These terminals are formed as tabs so that push-on connectors can be inserted over these tabs. Therefore, once the cap has been removed, the operator need merely remove the field lead and can then withdraw the entire brush unit out of the motor casing. If the brush has to be replaced, the brush lead likewise equipped with a push-on connector is disconnected from the brush unit merely by pulling off the push-on connector from the other terminal. Another brush is mounted in the holder and its lead pushed on the terminal. Then the brush unit is returned to its position in the motor casing and the cap secured in place.

A portion of the tool housing is concentric with and surrounds the motor casing such that bottom edge of this housing portion and the cap removably attached to motor casing conjointly define an air gap through which air can be drawn into the motor casing.

BRIEF DESCRIPTION OF THE DRAWINGS

The invention will now be explained with reference to the drawings wherein.

DETAILED DESCRIPTION OF THE INVENTION

Figure 1:
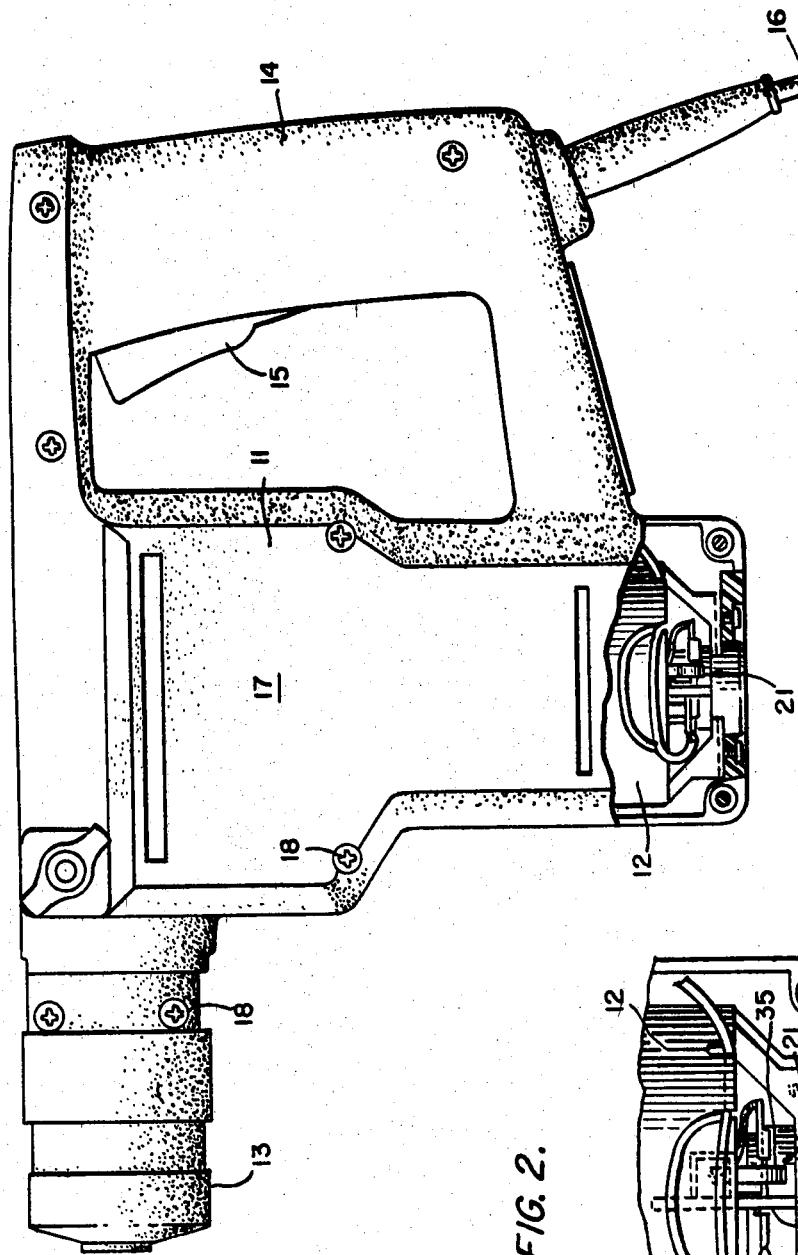
FIG. 1 is a side elevation view of the tool wherein the area of interest has been broken out to illustrate in part the brush assembly and mounting arrangement according to the invention.
Figure 2:
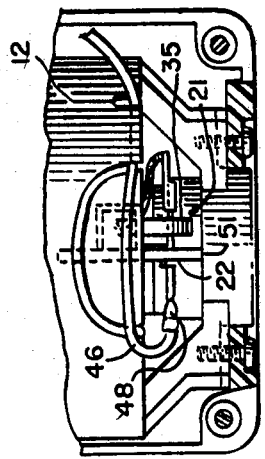
FIG. 2 is the same elevation view as in FIG. 1 showing a fragment of the tool and the details of the assembly in an enlarged format.
Figure 3:
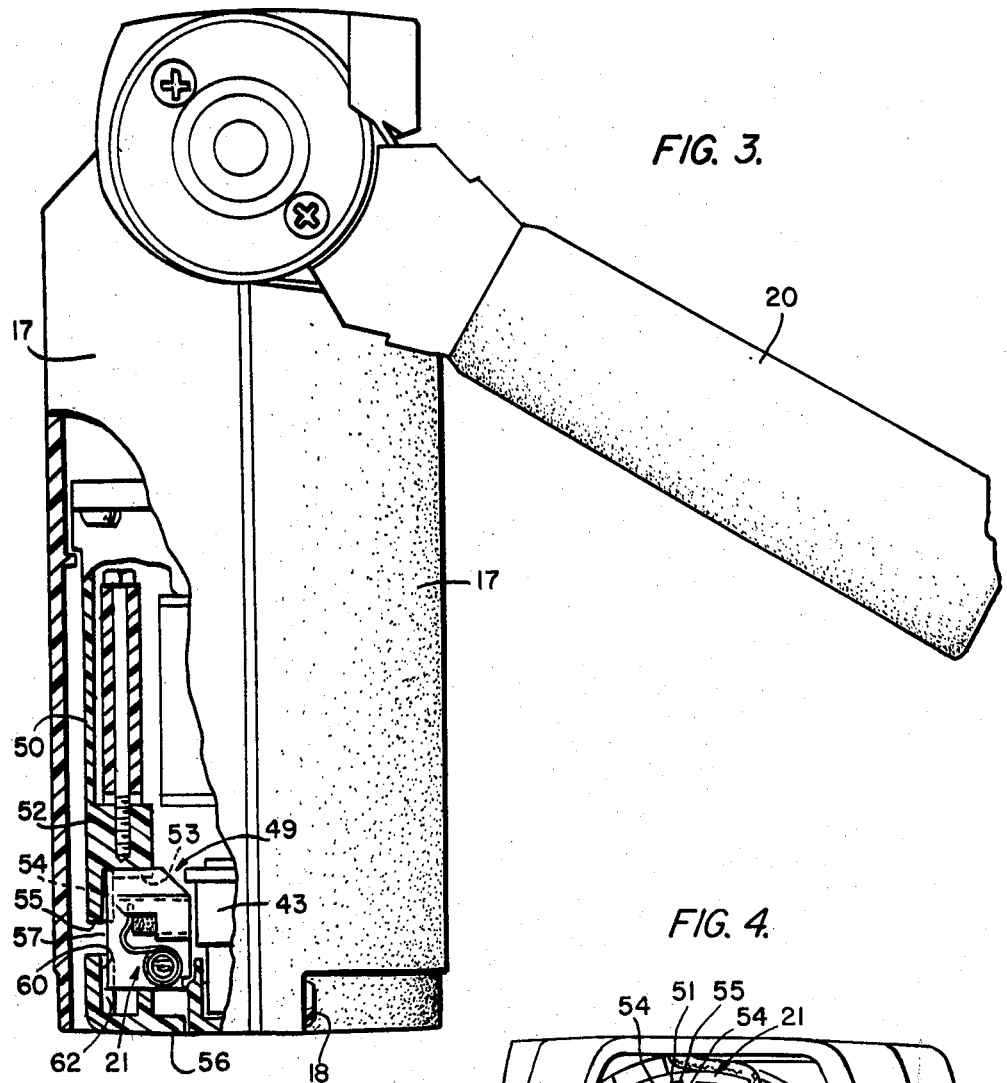
FIG. 3 is a front elevation of the tool wherein the area of interest has been broken out to illustrate in part the assembly from another perspective.

Now, turning to the drawings attention is directed to FIGS. 1 and 3 for a general view of the rotary hammer 10 of the present invention. For information's sake, a few details will be pointed out immediately hereinafter to create the environment to which the present invention pertains. The rotary hammer includes a housing 11 incorporating the operative details such as an electric motor 12 and suitable transmission means (not shown) to supply both rotary motion to the forwardly extending tool holder 13 and percussive impulses to the end of a drill bit suitably secured by the tool holder 13. The other side of the rotary hammer has a handle 14 which is shown to be integral with respect to the housing 11. The handle 14 is also supplied with a conveniently located conventional electric switch 15 whereby the electricity carried into the device by electric conduit 16 at the bottom of the handle is distributed to the electric motor 12.

The housing 11 is assembled of two clam shell parts 17 defining approximately similar volumes. All the internal and operative elements are totally enclosed by these parts which are moldings of high impact nylon. The parts 17 are complementary and are secured together by means of a plurality of strategically positioned screws 18 located along the periphery of the parts. From FIG. 3, the rotary hammer is also supplied with a removable handle 20 positioned at the forward end thereof and somewhat at an oblique angle. This detachable handle 20 is constructed from ABS plastic and is nose mounted with a zinc-plated metal strap, which is adjustable through 360° and is released by a twist of the handle.

The basic tool has now been discussed in which the brush assembly and mounting arrangement will be described. Although the tool described herein is a rotary hammer, it is noted that the brush assembly and mounting arrangement according to the invention can be utilized in other portable tools. Attention will now be focused on the preferred embodiment of the invention.

Within the housing 11 there is mounted a motor casing 50 in which the motor 12 is mounted. The motor casing 50 is open at its lower end whereat the brush assembly 21 according to the invention is mounted. The brush assembly includes two brush units 49 each of which is made up of a planar board 22 and a brush holder 26 made from a metal blank and mounted thereon.

Reference will now be made to FIGS. 5 to 9 showing the construction of the brush unit without the brush spring and brush in place.

Figure 9:
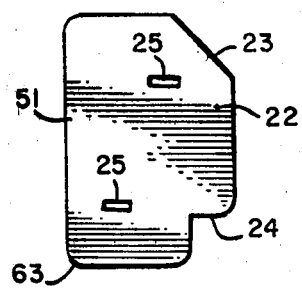
FIG. 9 is a side elevation view of a blank board used in the construction of the brush unit of the brush assembly.

Accordingly, attention is directed to a side view of a planar board 22 of thin but rigid material and relatively small dimensions as clearly shown by FIG. 9. It is bevelled at a top corner 23 to avoid interference with any rotating parts of the electric motor and has a shoulder 24 on the same side as the bevel at a bottom portion. It is constructed of non-conducting material such as synthetic resin-bonded paper of constant thickness.

Mounting means to the board are supplied by two small rectangularly shaped slots 25 through which metal tabs from a part of the unit are inserted and are then twisted in a retaining manner.

Figure 5:
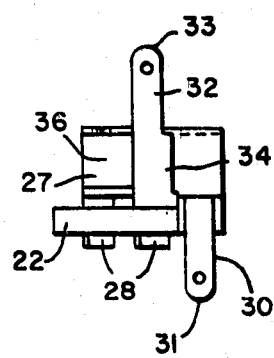
FIG. 5 is a bottom plan view of a brush unit of the brush assembly without the brush spring and carbon brush in place.
Figure 6:
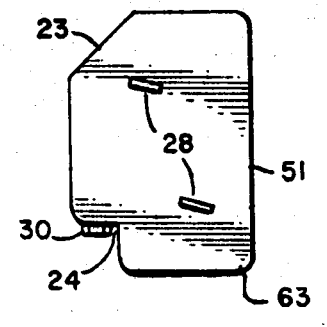
FIG. 6 is a side elevation of the brush unit of FIG. 5 showing the tabs securing the brush housing to the planar board.

The board 22 has mounted thereon a carbon brush holder 26 made from a single thin metal blank. The blank is bent to form a three sided channel 27 with the fourth side being defined by a portion of the board 22. One end of the three sided channel has a first bent tab-like element 30 which underlies the shoulder 24 and terminates in a first male connector 31. A second bent tab-like element 32 extends in the opposite direction to terminate in a second male connector 33 as can be seen both from FIGS. 5 and 8. FIG. 5 also illustrates the fact that the second bent element has a widened portion 34 which is adapted to act as a mandrel for spiral or clock spring 35 more about which will be related hereinafter.

Figure 7:
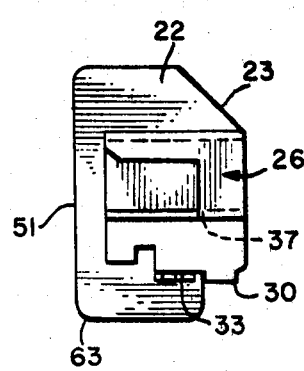
FIG. 7 is a side elevation of the brush unit showing brush housing.
Figure 8:
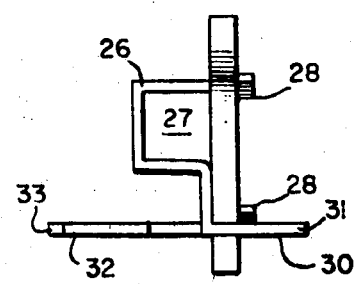
FIG. 8 is an end view of the brush unit looking from the commutator.
Figure 11:
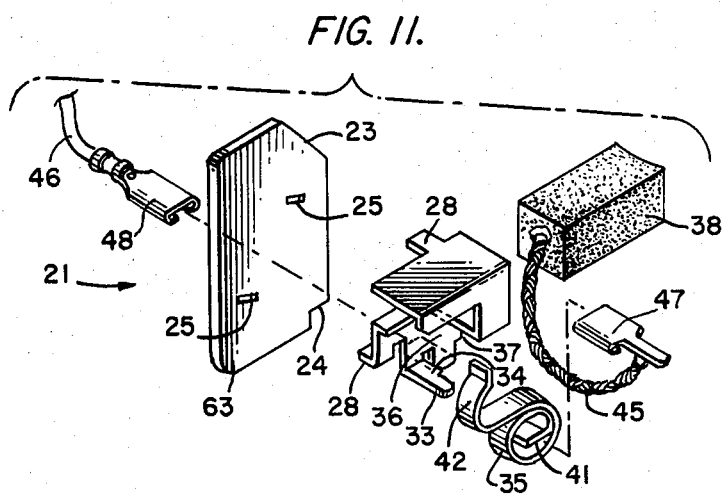
FIG. 11 is an exploded perspective view of a brush unit of the brush assembly.

From FIG. 7, the wall of the three-sided channel possesses an elongated recess 36 beginning at one end and progressing in the direction towards the commutator (when viewed with the brush unit in place) but terminating therebefore with an abutting edge 37 (FIG. 11).

As FIGS. 5 to 9 include only the bent metal blank but not the aforementioned spiral spring 35 and carbon brush 38 and its concomitant electric connector 45, attention is directed to FIG. 11 for a view of the brush unit 49 in exploded fashion. Further, note that by means of FIG. 10, the component parts are seen to be suitably assembled. The carbon brush 38 is slidably mounted into the brush holder 26 formed by the metal blank. The spiral spring 35 is mounted about the second bent element 32 with its inner end 41 suitably bent as a stop to resist turning while the other active end 42 is suitably deformed to lie in abutment with the end of the carbon brush 38 not in contact with the commutator 43 of the rotor 44 of the electric motor 12. The second male connector 33 has a first female connector 47 with a short electric braided pigtail 45 that is secured to the end of the carbon brush 38 having the abutting spring 35. The spiral spring urges resiliently the carbon brush 38 towards the commutator 43. As the block of the carbon brush is eroded, the spring moves about the recess 36 and continues to function as heretofore said until further movement is prevented when the active end of the spiral spring strikes abutting edge 37.

The first male connector 31 has a second female electric connector 48 forming the end of the lead 46 which connects to the field of the motor. This connection can be seen in FIGS. 10 and 11.

Note from FIG. 11 the spiral spring 35 and that it is mounted about the widened portion 34 of the second male connector 33. The spiral spring applys a near constant pressure and is less prone to jamming by accumulated dirt.

Figure 4:
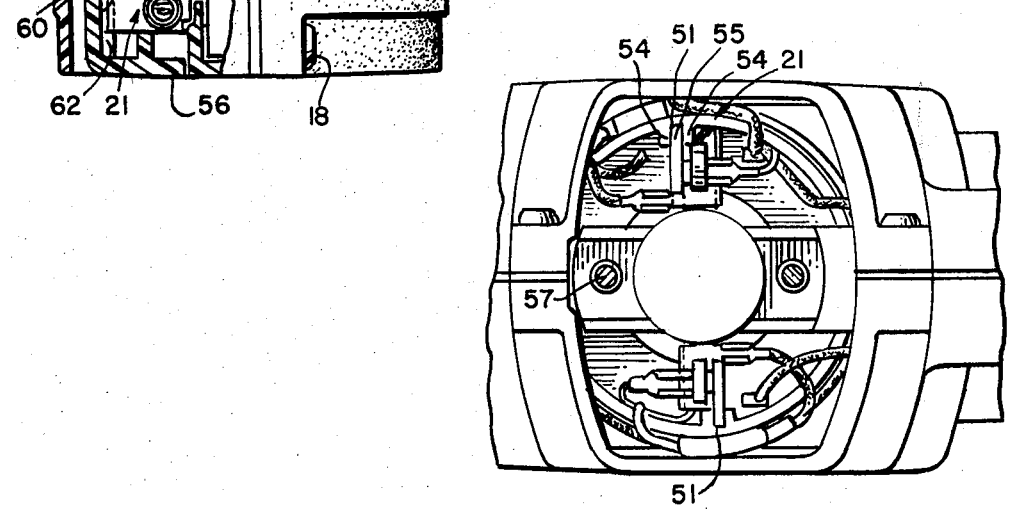
FIG. 4 is a bottom view of the brush assembly with the protective cap removed to reveal the brush units.

Of considerable importance to the invention is the ingenious arrangement for mounting and retaining the brush units in their respective positions about 180° apart on both sides of the commutator 43 of the electric motor. The aforementioned board 22 of the brush unit 49 serves this purpose admirably. Attention is directed to FIGS. 3 and 4. The housing 11 surrounds the motor casing of the electric motor 12. The motor casing provides alignment and receiving means for the brush units on its inner wall. The motor casing 50 is supplied with an internally radiating annular rib 52 at the top facing portion to which the stator is attached. The portion of the rib 52 that is facing downwardly has an elongated radial groove 53 dimensioned to accept the top portion of the board. The internally facing wall of the motor casing has inwardly radiating small separated walls 54 conjointly defining a groove 55 as more clearly seen in FIGS. 4 and 10, suitably dimensioned to accept a portion of the rearward edge 51 of the board. It is not necessary for the board 22 to be secured or affixed into the formed grooves 53 and 55. The grooves 53 and 55 are the receiving means for a brush unit 49.

A flanged cap 56 of plastic material is mounted at the bottom of the motor casing 50 by two machine screws 58 and serves to hold the brush units 49 in place.

It should be noted that flanged cap 56 possesses formations 59 formed at opposite sides on the inner wall thereof. Each formation 59 includes a groove 60 between two projections 61 and an abutment base 62 at the end of the groove 60. The groove is designed to accept into placement the lower corner 63 of the board 22. Additionally displaced inwardly radially from the groove is an upwardly facing cradle 64 designed to support the underside or bottom of the board to give a two point support at the bottom of the board by means of the aforementioned base 62 and the cradle 64. The formations 59 and cradles 64 conjointly define holding means formed on the cap 56 for firmly holding the planar boards 22 and house the brush units 49 in position in the receiving means 53, 55 when the cap 56 is secured in place by the machine screws 58.

Figure 10:
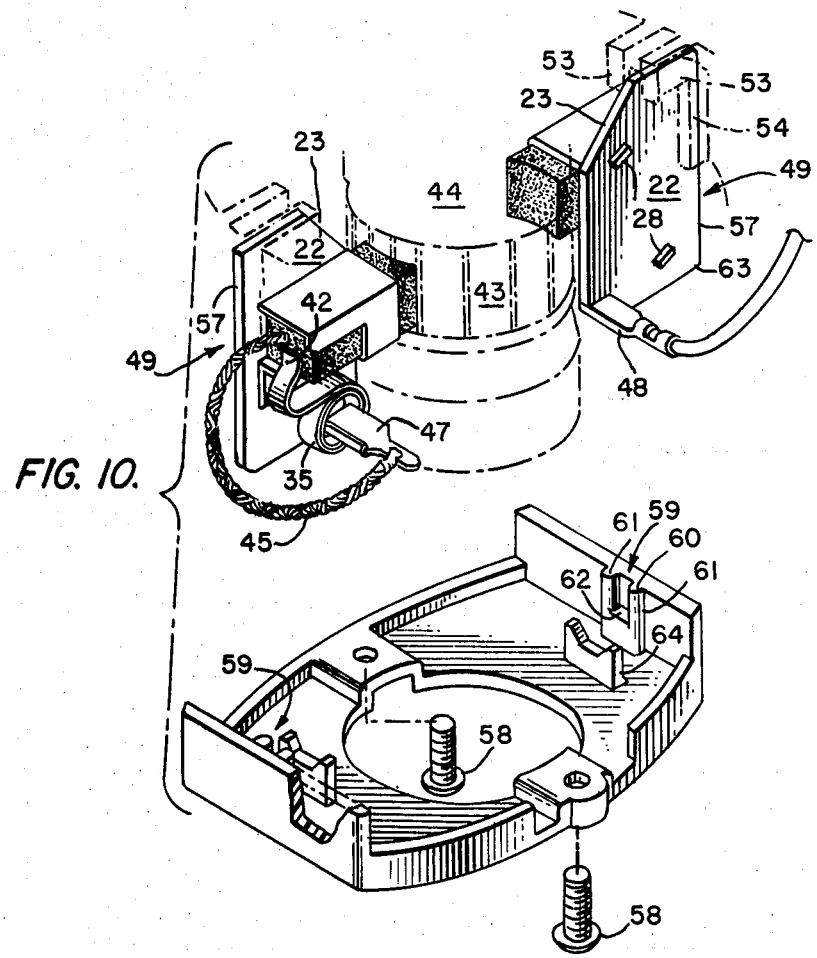
FIG. 10 is an exploded perspective view showing a pair of brush units in place and showing the end cap removed from the motor casing.

FIG. 3 is illustrative as to the manner by which the brush units 49 are firmly secured in the motor casing 50 by means of the flanged cap 56. Removal of the single cap 56 exposes both brush units 49 and makes them accessible for easy withdrawal from the casing 50 once the electric wires 46 carrying female electric connectors 48 have been disengaged from the respective male connectors 31. The brush beads 45 need only be disconnected when the carbon brush is to be replaced. The exploded view afforded by FIG. 10 shows the interaction of the cap with the brush units.

As was stated the recess 36 terminated in abutting edge 37 against which the active end 42 of the spiral spring 35 abuts when the carbon brush 38 is severely worn down. The abutting edge 37 prevents the spring 35 from coming in contact with the commutator of the electric motor.

Whenever it is desirable to change the brushes of the electric motor, the cap 56 is removed by removing the screws 58 holding it in place. The brush units 49 may be slid out of radial grooves 53 and the side grooves 55. Thereafter, the push-on connector 48 can be disconnected and the brush unit 49 withdrawn and entirely separated from the tool. This facilitates exchange of the entire brush unit 49 or just the carbon brush 38 per se. The brush unit 49 can then be replaced in its receiving means and the cap secured in position on the motor casing 50.

We claim:

1. A portable electric tool comprising:
    an electric motor housed in a motor casing;
    a brush assembly having two brush units;
    each brush unit including a planar board having a brush housing mounted thereon for holding a brush in contact with the commutator of the motor;
    said motor casing having radial and axial internally positioned grooves constructed to removably receive edge portions of said planar boards therein at a location adjacent the commutator; and
    a single cap removably mounted to the motor casing so as to expose both said brush units to facilitate their easy withdrawal from and insertion into said grooves, said cap having internally thereof portions in abutment with said planar boards to thereby firmly hold said planar boards in position in said grooves when said cap is secured in place.

2. A portable electric tool, comprising:
    an electric drive motor housed in a motor casing, and defining a longitudinal axis about which an armature of the motor rotates;
    a brush assembly comprising two brush units;
    each brush unit including a planar board made of insulating material and having a brush housing mounted thereon for holding a brush in contact with the commutator of the motor;
    receiving means, formed in the motor casing, for removably receiving the planar boards therein at a location adjacent the commutator, said receiving means comprising two L-shaped grooves formed in said motor casing corresponding to respective edge portions of said planar boards for receiving the same therein to radially and axially position said boards in the motor casing so that said boards are substantially parallel to said longitudinal axis; and
    cap means, removably mounted to the motor casing, for exposing both said brush units to facilitate their easy withdrawal from and insertion into said receiving means.

3. The improvement of claim 2 being characterized by said cap means being a single cap 56 and by holding means 64, 59 formed on said cap 56 for firmly holding said planar board 22 in position in said receiving means 53, 55 when said cap 56 is secured in place.

4. A portable electric tool, comprising:
    an electric drive motor housed in a motor casing, and defining a longitudinal axis about which an armature of the motor rotates;
    a brush assembly comprising two brush units;
    each brush unit including a planar board having a brush housing mounted thereon for holding a brush in contact with the commutator of the motor;
    receiving means, formed in the motor casing, for removably receiving the planar boards therein at a location adjacent the commutator, said receiving means being configured to radially and axially position said boards in the motor casing so that said boards are substantially parallel to said longitudinal axis;
    cap means, removably mounted to the motor casing, for exposing both said brush units to facilitate their easy withdrawal from and insertion into said receiving means;
    said cap means being a single cap, and further comprising holding means, formed on said cap, for firmly holding said planar board in position in said receiving means when said cap is secured in place; and
    said receiving means comprising two L-shaped grooves formed in said motor casing corresponding to respective edge portions of said planar boards for receiving the same therein.

5. The tool of claim 4, wherein said holding means includes respective grooves formed on the inner wall of said cap for likewise receiving said planar boards therein to firmly hold said boards in said motor casing.

6. A portable tool such as a rotary hammer or the like, comprising:
    a motor casing;
    an electric motor mounted in the motor casing;
    a brush assembly for the electric motor, the brush assembly including two brush units;
    a cap, removably mounted to the motor casing, for exposing said brush units to facilitate their easy withdrawal from and insertion into said motor casing;
    each brush unit comprising planar support means, tubular means affixed to said planar support means, said tubular means and said planar support means being disposed radially with respect to the commutator of the electric motor when in operable position, a carbon brush slidably positioned in said tubular means having one end in abutment with the commutator when in operable position, a spiral spring having an active end, said spiral spring being mounted on said tubular means whereby the active end is in urging abutment against the other end of said carbon brush to spring load said carbon brush against the commutator, said tubular means having stop means for said active end of said spiral spring to prevent said active end of said spring from coming into contact with the commutator, and means on said tubular means for receiving electrical connection to a source of electricity; and
    the motor casing having radial and axial internally positioned grooves constructed to retain a portion of said planar support means.

7. The tool of claim 6, wherein the motor casing has an opening to obtain access to said brush assembly and said opening has a closure cap constructed internally thereof to have portions in abutment with portions of said planar support means to thereby retain said brush assembly in said motor casing.

8. The tool of claim 7, wherein the planar support means is constructed of non-conductive material.

9. The tool of claim 8, wherein said tubular means is constructed of metal and has integral therewith electric connection means.

10. A portable electric tool, comprising:
an electric motor housed in a motor casing, and defining a longitudinal axis about which an armature of the motor rotates;
a brush assembly of the motor having two brush units;
a cap, removably mounted to the motor casing, for exposing said brush units to facilitate their easy withdrawal from and insertion into said motor casing;
each brush unit including a planar board made of insulating material and having a metal brush housing mounted thereon for holding a brush in contact with the commutator of the motor, said planar boards being removably received within said motor casing at a location adjacent the commutator;
said motor casing having radial and axial internally positioned grooves constructed to retain portions of said planar boards, said planar boards being so retained radially with respect to said commutator and parallel to said longitudinal axis;
first electrical connection means formed on said brush housing for removably receiving electrical energy conducting means; and
second electrical connection means formed on said brush housing for removably receiving a lead connected to said brush whereby electrical energy transmitted to the commutator passes from said first electrical connection means to said brush through said housing.

11. The portable electric tool of claim 10, further comprising a single cap removably mounted to the motor casing so as to completely expose both said brush units to faciliate their easy withdrawal from and insertion into said receiving means.

12. The tool of claim 11, further comprising holding means, formed on said cap, for firmly holding said planar board in position in said receiving means when said cap is secured in place.

* * * * *